May 31, 1955  A. LINDEL ET AL  2,709,282

PROCESS AND APPARATUS FOR HANDLING TEXTILES

Filed Sept. 30, 1952  2 Sheets-Sheet 1

INVENTORS:
AUGUST LINDEL
AND HEINRICH HÖFER
BY

INVENTORS:
AUGUST LINDEL AND
HEINRICH HÖFER

United States Patent Office 2,709,282
Patented May 31, 1955

2,709,282

PROCESS AND APPARATUS FOR HANDLING TEXTILES

August Lindel, Grebben (Rhineland), and Heinrich Höfer, Oberbruch (Rhineland), Germany, assignors, by mesne assignments, to American Enka Corporation, Enka, N. C., a corporation of Delaware Application September 30, 1952, Serial No. 312,374

Claims priority, application Germany October 1, 1951

15 Claims. (Cl. 19—161)

The present invention relates to a process and apparatus for handling textiles in a predetermined manner so as to change the condition thereof.

More particularly, the present invention relates to a process and apparatus for increasing the width of a band of fibers while decreasing the thickness thereof.

In certain stages of the production of textiles, and in the production of upholstery fabrics in particular, there is a stage where artificial fibers and the like, after leaving a spinning machine are gathered together in a band which, in order to be placed in a suitable condition for further operations, must be spread out so as to have the thickness of the band decreased and the width thereof increased for the purpose of arranging the individual fibers beside and parallel to each other as much as possible. Up to the present time this operation has been performed by hand, which is very inconvenient, because the operation consumes a great amount of time and greatly reduces the speed with which a band of such fibers may be moved.

It is therefore an object of the present invention to provide a process and apparatus for automatically and mechanically increasing the width of a band of fibers while decreasing the thickness thereof.

A further object of the present invention is to provide a process and apparatus of the above type which is fully continuous so that there is no interruption in the movement of the band.

Another object of the present invention is to provide an apparatus which may be adjusted to widen a band of fibers to a predetermined extent while decreasing the thickness thereof.

An additional object of the present invention is to provide an apparatus of the above type which is of an extremely simple construction and very reliable in operation.

With the above objects in view, the present invention mainly consists of a process for decreasing the thickness of a band of fibers while increasing the width thereof, this process including the steps of continuously moving such a band of fibers along a predetermined path extending along the length of the band, simultaneously engaging the band of fibers at a plurality of spaced points arranged transversely of the path, and simultaneously moving these points respectively along divergent lines extending in the general direction of the path so as to thereby increase the width of the band of fibers while decreasing the thickness thereof.

Also, with the above objects in view, the present invention mainly consists of an apparatus for decreasing the thickness of a band of fibers while increasing the width thereof, this apparatus including a stationary shaft formed with a plurality of spaced grooves respectively located in planes which are inclined to each other and all of which intersect in a straight line located in a plane normal to the central axis of this stationary shaft. A plurality of discs are respectively mounted in these grooves for turning movement about the shaft, and a plurality of needles are fixed to each of the discs and extend from the periphery thereof in a substantially radial direction so that when a band of fibers engages some needles of the discs and are moved therewith about the shaft at a part thereof where the grooves diverge from each other, the band of fibers will be spread out by the needles so as to increase the width of the band while decreasing the thickness thereof.

The novel features which are considered as characteristic for the invention are set forth in particular in the appended claims. The invention itself, however, both as to its construction and its method of operation, together with additional objects and advantages thereof, will be best understood from the following description of specific embodiments when read in connection with the accompanying drawings, in which;

Figure 2:
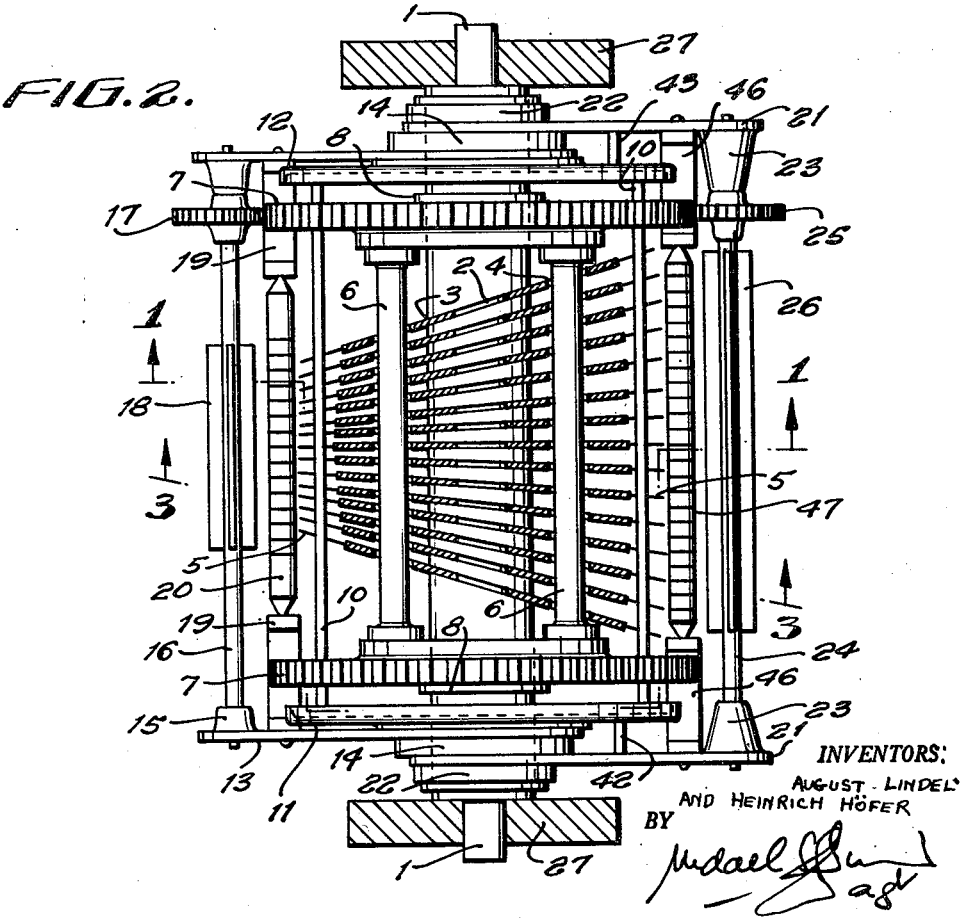
Fig. 2 is a side elevational view, partly in section and partly broken away, of the structure of Fig. 1, taken along line 2—2 of Fig. 1 in the direction of the arrows.

Referring now to the drawings, there is shown in Fig. 2 the stationary vertical parts 27 which are fixed to and carry the horizontal shaft 1, at opposite ends of the latter, so that this shaft 1 also is stationary. Along an intermediate part thereof, the shaft 1 is formed with a plurality of endless grooves 2 extending about the outer surface of the shaft 1. As is apparent from Fig. 2 these grooves are respectively located in planes which are inclined to each other and all of which intersect along a straight line which is located in a plane normal to the axis of shaft 1 and passing through the latter at a point midway between the grooves, one of these grooves being itself located in this plane normal to the shaft 1 so that only this one groove is circular while the remaining grooves on opposite sides thereof are elliptical.

Figure 3:
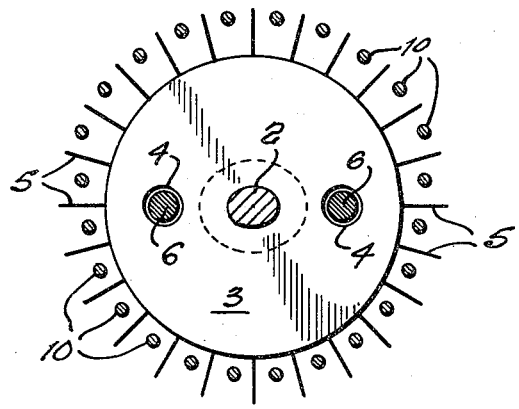
Fig. 3 is a fragmentary sectional view taken along line 3—3 of Fig. 2 in the direction of the arrows.

A plurality of discs 3, one of which is shown in Fig. 3, are respectively located in these grooves for turning movement about the shaft 1. These discs may be mounted in the grooves in any suitable way. For example, the discs may be formed in two semicircular parts which are joined together after being located in the grooves.

To the periphery of each disc 3 there are connected a number of needles 5 which extend from the disc in a radial direction. The discs are each formed with two or more openings 4 passing therethrough, and the openings of all of the discs are aligned with each other.

Figure 1:
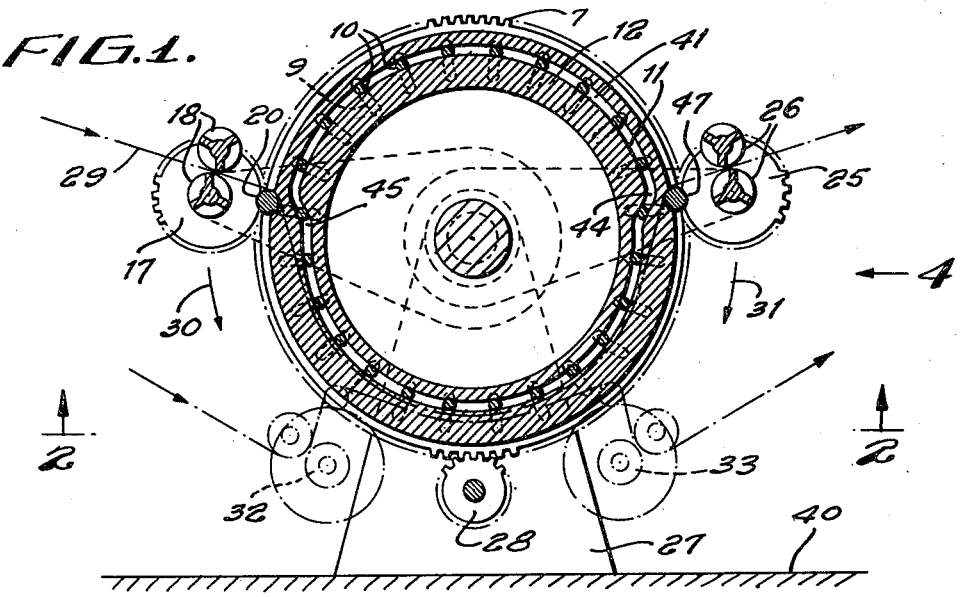
Fig. 1 is a sectional view of the structure of Fig. 2 taken along line 1—1 of Fig. 2 in the direction of the arrows.

A bar 6 extends through each set of aligned openings 4 and is fixedly connected at its opposite ends to a pair of gears 7, respectively, which are freely mounted on the stationary shaft 1 for rotation thereabout. Collars, snap rings, or the like, 8 are fixed to the shaft 1 and engage the gears 7 to prevent the latter from moving axially along the shaft 1. Each of the gears 7 is formed adjacent to its periphery with a plurality of radial slots 9 passing therethrough (Fig. 1).

A pair of circular plates 11 and 12 are mounted in annular grooves of the shaft 1 adjacent to the gears 7, respectively, for turning movement about the shaft 1. These plates 11 and 12 may be originally formed in two halves which are joined together after they are located in the grooves of the shaft 1, as was described above in connection with the discs 3. Each of these plates 11 and 12 has a surface facing a gear 7 and formed with a groove 41 having a predetermined shape, shown in Fig. 1, for a purpose described below. The grooves 41 of the discs 11 and 12 are identical and are located in alignment over each other so that each curve of one groove 41 is located directly opposite a corresponding curve of the other groove 41.

A number of rods 10 extend, in a direction parallel to the axis of shaft 1, through the slots of the gears 7, and each of the rods 10 has its opposite ends located within the grooves 41, respectively, so that these rods 10 are freely movable along the aligned grooves 41. The successive rods 10 are located between each pair of needles 5 of each disc 3, and the number of slots 9 and rods 10 equals the number of needles on each disc 3.

The plates 11 and 12 are respectively fixed by members 42 and 43 to plates 21 which are turnably mounted on the shaft 1 and which bear against the spacer members 14. A pair of nuts or the like 22 engage the plates 21 to hold same in an adjusted position on the shaft 1. These plates 21 carry bearings 23 in which are rotatively mounted one of the shafts 24 of a pair of fluted rollers 26 which have the fluting thereof staggered, as is illustrated in Fig. 1. Also fixed to the plates 21 are a pair of bearings 46 which turnably support a cylindrical guide member 47 for guiding a band of fibers to the discharge rollers 26.

A pair of additional plates 13, similar to the plates 21, are turnably mounted on the shaft 1 and located between these plates 21, each plate 13 being located between one of the discs 11 and 12 and a spacer member 14, as illustrated. The plates 13 are located opposite each other, in the same way as the plates 21, and carry bearings 15 which turnably support one of the shafts 16 of a pair of fluted rollers 18 whose flutings are staggered, as illustrated in Fig. 1, these rollers 18 serving as supply rollers to feed a band of fibers 29 (Fig. 1) into the apparatus. The plates 13 also have fixedly mounted thereon a pair of bearings 19 similar to the bearings 46 and turnably supporting a guide roller 20 for guiding a band of fibers 29 from the feed rollers 18 to the apparatus. As is shown in Fig. 4, the bearings 46 and 19 are U-shaped so as to clear the gears 7.

Figure 4:
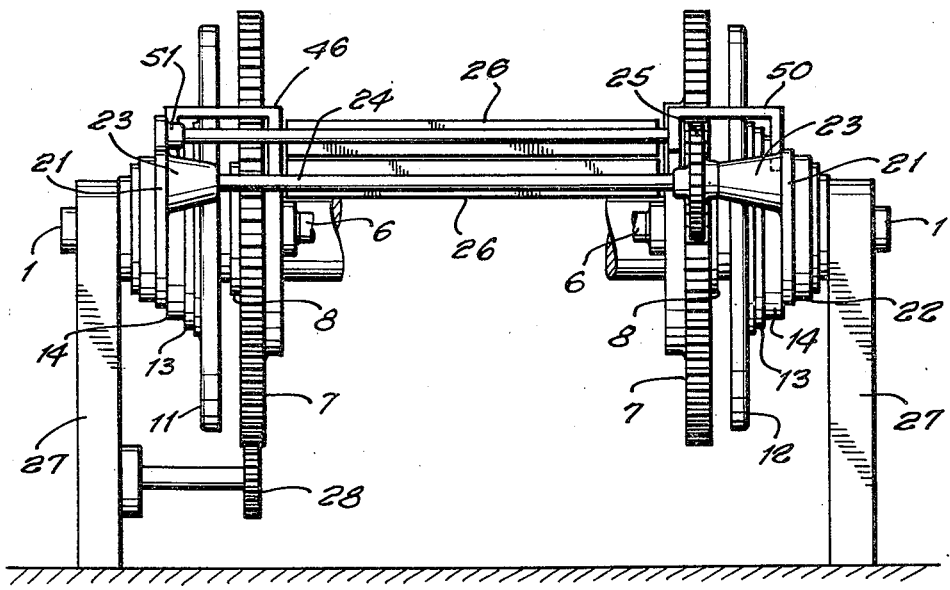
Fig. 4 is a view of the apparatus of Fig. 1 as seen in the direction of arrow 4 of Fig. 1.

As is apparent from Fig. 1, the supports 27 are fixed to a stationary frame part 40 and the gears 7 are driven by a pinion 28 which meshes with the left one of these gears 7, as viewed in Fig. 4. The other gear 7 drives gears 17 and 25 fixedly mounted on one of the shafts 16 and 24, respectively, so as to turn the feed rollers 18 and discharge rollers 26. As is shown in Fig. 4, the right ends of the other of the shafts 24 and 16 are supported in a U-shaped bearing 50 similar to the bearings 19 and 46 so as to clear the gears 17 and 25, and the opposite ends of these other shafts 24 and 16 are mounted in bearings 51 smaller than bearings 23 and 15.

The above-described apparatus operates in the following manner:

Assuming that the parts are set in the position illustrated in the solid lines in Fig. 1, the band of fibers 29, whose width is to be increased while its thickness decreases, is threaded through the feed rollers 18, about the guide roller 20, against the rods 10 on the lower half of the apparatus, as viewed in Fig. 1, about the guide roller 47, and through the discharge rollers 26 from where the band 29 moves to a different part of the machine to have further operations performed thereon. Since the needles 5 extend beyond the rods 10, it is apparent that the band of fibers 29 will be engaged by these needles. The drive from the pinion 28 will then be started, and this will cause the gears 7 to turn in a counter-clockwise direction, as viewed in Fig. 1. Therefore, the band of fibers will start to move out of the discharge rollers 26 and through the feed rollers 18 to the apparatus. As is apparent from Fig. 1, the band of fibers is fed along only one side of the apparatus and in the direction on that side in which the grooves 2 diverge from each other. Thus, when a given part of the band is engaged by the needles at the left of the apparatus, as viewed in Figs. 1 and 2, this part of the band will be gradually fed so as to have its width increased and its thickness decreased because the needles engaging the same gradually move apart from each other to the position shown at the right of Fig. 2, so that in this way the desired result of increasing the width of a band of fibers while decreasing the thickness thereof is produced in an automatic and continuous manner.

It will be seen that the grooves 41 have, leading toward the guide roller 47, a curved part 44 which extends away from the axis of shaft 1 and toward the guide roller 47. Therefore, the rods 10, which turn with the gears 7 and the needles 5, move away from the axis of shaft 1 as they approach the guide roller 47 and in this way move the band from the needles 5 to the guide roller 47. This prevents a pulling of the band of fibers from the needles 5 by the discharge rollers 26 and guide roller 47, which might damage the band of fibers. The rods 10 in cooperation with the grooves 41 of the plates 11 and 12 provide a means for gradually moving the band of fibers from the needles 11 just before they are discharged to the roller 47 and rollers 26. The grooves 41 have opposite the curved portions 44 thereof a similar inwardly curved portion 45 which moves the rods toward the axis of shaft 1 just before the band of fibers are engaged by the needles 5.

It is apparent that in the solid line position of the part shown in Fig. 1, the band of fibers will be widened to the greatest extent possible with the disclosed apparatus because the band of fibers is engaged by the needles for almost 180° about the axis of shaft 1. In order to adjust the apparatus so as to produce a lesser degree of widening of the band of fibers, it is only necessary to loosen the nuts 22 which permits the plates 21 and the plates 13 to be turned toward each other in the direction of the arrows 31 and 30, respectively (Fig. 1) to the dotted line positions 33 and 32, respectively (Fig. 1) where the band of fibers is engaged by the needles for a much smaller distance so as to greatly decrease the extent of widening. The nuts 22 are tightened when the feed and discharge rollers, together with the guide rollers 20 and 47, are located in an adjusted position, these nuts serving to press the plates 21 and 13 together with the spacer 14 against the plates 11 and 12, which, as was pointed out above, are turnably mounted in annular grooves of the shaft 1 so that they cannot approach each other and therefore cannot prevent movement of the rods 10. The connection of the plates 11 and 12 to the plates 21 by the members 42 and 43 causes these plates 11 and 12 to turn with the plates 21 so that the plates 11 and 12 automatically assume a predetermined fixed position with respect to the roller 47 irrespective of the adjusted position of the apparatus, and in this way the location of the curved part 44 of grooves 41 just ahead of the roller 47 is automatically assured.

It will be understood that each of the elements described above, or two or more together, may also find a useful application in other types of textile handling process and apparatus differing from the types described above.

While the invention has been illustrated and described as embodied in a process and apparatus for widening a band of fibers while decreasing the thickness thereof, it is not intended to be limited to the details shown, since various modifications and structural changes may be made without departing in any way from the spirit of the present invention.

Without further analysis, the foregoing will so fully reveal the gist of the present invention that others can by applying current knowledge readily adapt it for various applications without omitting features that, from the standpoint of prior art, fairly constitute essential characteristics of the generic or specific aspects of this invention and, therefore, such adaptations should and are intended to be comprehended within the meaning and range of equivalence of the following claims.

What is claimed as new and desired to be secured by Letters Patent is:

1. A process for decreasing the thickness of a band of fibers while increasing the width thereof, comprising the steps of continuously moving the band of fibers along a predetermined path extending along the length of said band; simultaneously piercing the band of fibers at a plurality of spaced portions arranged transversely of said path; and simultaneously moving said pierced portions respectively along divergent lines extending in the general direction of said path so as to thereby increase the width of the band of the fibers while decreasing the thickness thereof.

2. A process for decreasing the thickness of a band of fibers while increasing the width thereof, comprising the steps of piercing the band of fibers at a plurality of spaced portions arranged transversely of said band; and simultaneously moving said pierced portions respectively along divergent lines extending in the general direction of said band so as to thereby increase the width of the band of the fibers while decreasing the thickness thereof.

3. A process for decreasing the thickness of a band of fibers while increasing the width thereof, comprising the steps of piercing the band of fibers at a plurality of spaced portions arranged transversely of said band; and spreading said pierced portions apart from each other so as to thereby increase the width of the band of the fibers while decreasing the thickness thereof.

4. Apparatus for increasing the width of a band of fibers while decreasing the thickness thereof, comprising, in combination, a support; guide means mounted on said support for guiding a band of fibers in the direction of its length along a predetermined path; and a plurality of piercing members arranged transversely of said path and being freely mounted on said support for respective movement along divergent lines extending in the general direction of said path so that a band of fibers moving along said path will be pierced by said piercing members and will move the latter along said lines to be spread apart thereby so as to increase the width of the band of fibers while decreasing the thickness thereof.

5. Apparatus for decreasing the thickness of a band of fibers while increasing the width thereof, comprising, in combination, a support; a stationary shaft mounted on said support and being formed with a plurality of spaced grooves respectively located in planes which are inclined to each other and all of which intersect at a straight line located in a plane normal to the central axis of said stationary shaft; a plurality of discs respectively mounted in said grooves for turning movement about said shaft; and a plurality of needle members fixed to each of said discs at the periphery thereof and extending therefrom in a substantially radial direction, so that when a band of fibers engages some needles of said discs and are moved with the latter about said shaft at a part thereof where said grooves diverge from each other, the band of fibers will be spread out by said needles so as to increase the width of the band while decreasing the thickness thereof.

6. Apparatus for decreasing the thickness of a band of fibers while increasing the width thereof, comprising, in combination, a support; a stationary shaft mounted on said support and being formed with a plurality of spaced grooves, one of said grooves being circular and located in a plane normal to the axis of said shaft, a first group of said grooves being elliptical and located on one side of said one groove and being inclined in the same direction with respect to said one groove and to increasing extents as the grooves of said first group are located more distant from said one groove, and a second group of said grooves being elliptical and located on the opposite side of said one groove and being inclined in the same direction with respect to said one groove and in the opposite direction from said first group of grooves, said grooves of said second group being inclined to increasing extents as they are located more distant from said one groove; a plurality of discs respectively mounted in said grooves for turning movement about said shaft; and a plurality of needle members fixed to each of said discs at the periphery thereof and extending therefrom in a substantially radial direction, so that when a band of fibers engages some needles of said discs and are moved with the latter about said shaft at a part thereof where said grooves diverge from each other, the band of fibers will be spread out by said needles so as to increase the width of the band while decreasing the thickness thereof.

7. Apparatus for decreasing the thickness of a band of fibers while increasing the width thereof, comprising, in combination, a support; a stationary shaft mounted on said support and being formed with a plurality of spaced grooves respectively located in planes which are inclined to each other and all of which intersect at a straight line located in a plane normal to the central axis of said stationary shaft; a plurality of discs respectively mounted in said grooves for turning movement about said shaft; a plurality of needle members fixed to each of said discs at the periphery thereof and extending therefrom in a substantially radial direction, so that when a band of fibers engages some needles of said discs and are moved with the latter about said shaft at a part thereof where said grooves diverge from each other, the band of fibers will be spread out by said needles so as to increase the width of the band while decreasing the thickness thereof; feed means mounted on said shaft for adjustable movement about the axis thereof for feeding a band of fibers to said needles at a first predetermined location opposite said shaft; and discharge means mounted on said support for adjustable movement about the axis thereof for discharging the band of fibers from said needles at a second predetermined location opposite said shaft and spaced from said first predetermined location, whereby the distance between said feeding and discharge means may be adjusted to control the extent to which a band of fibers is widened.

8. Apparatus for decreasing the thickness of a band of fibers while increasing the width thereof, comprising, in combination, a support; a stationary shaft mounted on said support and being formed with a plurality of spaced grooves respectively located in planes which are inclined to each other and all of which intersect at a straight line located in a plane normal to the central axis of said stationary shaft; a plurality of discs respectively mounted in said grooves for turning movement about said shaft; a plurality of needle members fixed to each of said discs at the periphery thereof and extending therefrom in a substantially radial direction, so that when a band of fibers engages some needles of said discs and are moved with the latter about said shaft at a part thereof where said grooves diverge from each other, the band of fibers will be spread out by said needles so as to increase the width of the band while decreasing the thickness thereof; a first pair of plates turnably mounted on said shaft for adjustable movement about the axis thereof and being located opposite each other; a first pair of fluted rollers located next to each other, extending between said plates, and being turnably mounted thereon to feed a band of fibers to said needles at a first predetermined location opposite said shaft; a second pair of plates turnably mounted on said shaft for adjustable movement about the axis thereof and being located opposite each other; a second pair of fluted rollers located next to each other, extending between said second pair of plates, and being turnably mounted thereon to discharge a band of fibers from said needles at a second predetermined location opposite said shaft and spaced from said first predetermined location, whereby the distance between said first and second pairs of fluted rollers may be adjusted to control the extent to which a band of fibers is widened.

9. Apparatus for decreasing the thickness of a band of fibers while increasing the width thereof, comprising, in combination, a support; a stationary shaft mounted on said support and being formed with a plurality of spaced grooves respectively located in planes which are inclined to each other and all of which intersect at a straight line located in a plane normal to the central axis of said stationary shaft; a plurality of discs respectively mounted in said grooves for turning movement about said shaft, each of said discs being formed with an opening passing therethrough and all of said openings being located in alignment with each other; a plurality of needle members fixed to each of said discs at the periphery thereof and extending therefrom in a substantially radial direction, so that when a band of fibers engages some needles of said discs and are moved with the latter about said shaft at a part thereof where said grooves diverge from each other, the band of fibers will be spread out by said needles so as to increase the width of the band while decreasing the thickness thereof; a gear turnably mounted on said shaft for movement about the axis thereof and being located on one side of said discs; a bar fixed to said gear and extending through said aligned openings of said discs; and drive means operatively connected to said gear for turning the same so as to also turn said bar and discs therewith.

10. Apparatus for decreasing the thickness of a band of fibers while increasing the width thereof, comprising, in combination, a support; a stationary shaft mounted on said support and being formed with a plurality of spaced grooves respectively located in planes which are inclined to each other and all of which intersect at a straight line located in a plane normal to the central axis of said stationary shaft; a plurality of discs respectively mounted in said grooves for turning movement about said shaft, each of said discs being formed with an opening passing therethrough and all of said openings being located in alignment with each other; a plurality of needle members fixed to each of said discs at the periphery thereof and extending therefrom in a substantially radial direction, so that when a band of fibers engages some needles of said discs and are moved with the latter about said shaft at a part thereof where said grooves diverge from each other, the band of fibers will be spread out by said needles so as to increase the width of the band while decreasing the thickness thereof; a gear turnably mounted on said shaft for movement about the axis thereof and being located on one side of said discs; a bar fixed to said gear and extending through said aligned openings of said discs; drive means operatively connected to said gear for turning the same so as to also turn said bar and discs therewith; feed means mounted on said shaft for adjustable movement about the axis thereof for feeding a band of fibers to said needles at a first predetermined location opposite said shaft; and discharge means mounted on said support for adjustable movement about the axis thereof for discharging the band of fibers from said needles at a second predetermined location opposite said shaft and spaced from said first predetermined location, whereby the distance between said feeding and discharge means may be adjusted to control the extent to which a band of fibers is widened.

11. Apparatus for decreasing the thickness of a band of fibers while increasing the width thereof, comprising, in combination, a support; a stationary shaft mounted on said support and being formed with a plurality of spaced grooves respectively located in planes which are inclined to each other and all of which intersect at a straight line located in a plane normal to the central axis of said stationary shaft; a plurality of discs respectively mounted in said grooves for turning movement about said shaft, each of said discs being formed with an opening passing therethrough and all of said openings being located in alignment with each other; a plurality of needle members fixed to each of said discs at the periphery thereof and extending therefrom in a substantially radial direction, so that when a band of fibers engages some needles of said discs and are moved with the latter about said shaft at a part thereof where said grooves diverge from each other, the band of fibers will be spread out by said needles so as to increase the width of the band while decreasing the thickness thereof; a gear turnably mounted on said shaft for movement about the axis thereof and being located on one side of said discs, said gear being formed with a plurality of substantially radial slots extending therethrough and arranged along a circle extending about the axis of said shaft; a bar fixed to said gear and extending through said aligned openings of said discs; drive means operatively connected to said gear for turning the same so as to also turn said bar and discs therewith; feed means mounted on said shaft for adjustable movement about the axis thereof for feeding a band of fibers to said needles at a first predetermined location opposite said shaft; discharge means mounted on said support for adjustable movement about the axis thereof for discharging the band of fibers from said needles at a second predetermined location opposite said shaft and spaced from said first predetermined location, whereby the distance between said feeding and discharge means may be adjusted to control the extent to which a band of fibers is widened; a pair of plates fixed to said shaft on opposite sides of said discs, respectively, and each having a surface facing said discs and formed opposite said slots with a groove which is endless and extends away from the axis of said shaft at a portion of said groove which is located adjacent to said second predetermined location; and a plurality of rods extending through said slots of said gear and through the needles of said discs in a direction substantially parallel to the axis of said shaft, each of said rods having opposite ends respectively located within said grooves of said plates, so that when said gear is turned by said drive means, said rods turn together with said bar and discs and move toward said discharge means to move a band of fabric from said needles and toward said discharge needles.

12. Apparatus for decreasing the thickness of a band of fibers while increasing the width thereof, comprising, in combination, a support; a stationary shaft mounted on said support and being formed with a plurality of spaced grooves respectively located in planes which are inclined to each other and all of which intersect at a straight line located in a plane normal to the central axis of said stationary shaft; a plurality of discs respectively mounted in said grooves for turning movement about said shaft, each of said discs being formed with an opening passing therethrough and all of said openings being located in alignment with each other; a plurality of needle members fixed to each of said discs at the periphery thereof and extending therefrom in a substantially radial direction, so that when a band of fibers engages some needles of said discs and are moved with the latter about said shaft at a part thereof where said grooves diverge from each other, the band of fibers will be spread out by said needles so as to increase the width of the band while decreasing the thickness thereof; a gear turnably mounted on said shaft for movement about the axis thereof and being located on one side of said discs, said gear being formed with a plurality of substantially radial slots extending therethrough and arranged along a circle extending about the axis of said shaft; a bar fixed to said gear and extending through said aligned openings of said discs; drive means operatively connected to said gear for turning the same so as to also turn said bar and discs therewith; feed means mounted on said shaft for adjustable movement about the axis thereof for feeding a band of fibers to said needles at a first predetermined location opposite said shaft; discharge means mounted on said support for adjustable movement about the axis thereof for discharging the band of fibers from said needles at a second predetermined location opposite said shaft and spaced from said first predetermined location, whereby the distance between said feeding and discharge means may be adjusted to control the extent to which a band of fibers is widened;

a pair of plates turnably mounted on said shaft on opposite sides of said discs, respectively, and each having a surface facing said discs and formed opposite said slots with a groove which is endless and extends away from the axis of said shaft at a portion of said groove which is located adjacent to said second predetermined location, said pair of plates being connected to said discharge means for turning movement therewith about the axis of said shaft; and a plurality of rods extending through said slots of said gear and through the needles of said discs in a direction substantially parallel to the axis of said shaft, each of said rods having opposite ends respectively located with said grooves of said plates, so that when said gear is turned by said drive means, said rods turn together with said bar and discs and move toward said discharge means to move a band of fabric from said needles and toward said discharge needles.

13. Apparatus for decreasing the thickness of a band of fibers while increasing the width thereof, comprising, in combination, a support; a stationary shaft mounted on said support and being formed with a plurality of spaced grooves respectively located in planes which are inclined to each other and all of which intersect at a straight line located in a plane normal to the central axis of said stationary shaft; a plurality of discs respectively mounted in said grooves for turning movement about said shaft, each of said discs being formed with an opening passing therethrough and all of said openings being located in alignment with each other; a plurality of needle members fixed to each of said discs at the periphery thereof and extending therefrom in a substantially radial direction, so that when a band of fibers engages some needles of said discs and are moved with the latter about said shaft at a part thereof where said grooves diverge from each other, the band of fibers will be spread out by said needles so as to increase the width of the band while decreasing the thickness thereof; a gear turnably mounted on said shaft for movement about the axis thereof and being located on one side of said discs, said gear being formed with a plurality of substantially radial slots extending therethrough and arranged along a circle extending about the axis of said shaft; a bar fixed to said gear and extending through said aligned openings of said discs; drive means operatively connected to said gear for turning the same so as to also turn said bar and discs therewith; feed means mounted on said shaft for adjustable movement about the axis thereof for feeding a band of fibers to said needles at a first predetermined location opposite said shaft; discharge means mounted on said support for adjustable movement about the axis thereof for discharging the band of fibers from said needles at a second predetermined location opposite said shaft and spaced from said first predetermined location, whereby the distance between said feeding and discharge means may be adjusted to control the extent to which a band of fibers is widened; a pair of plates fixed to said shaft on opposite sides of said discs, respectively, and each having a surface facing said discs, and formed opposite said slots with a groove which is endless and extends away from the axis of said shaft at a portion of said groove which is located adjacent to said second predetermined location; and a plurality of rods extending through said slots of said gear and through the needles of said discs in a direction substantially parallel to the axis of said shaft, each of said rods having opposite ends respectively located within said grooves of said plates, so that when said gear is turned by said drive means, said rods turn together with said bar and discs and move toward said discharge means to move a band of fabric from said needles and toward said discharge needles, said rods respectively being located between each pair of needles on each of said discs.

14. Apparatus for decreasing the thickness of a band of fibers while increasing the width thereof, comprising, in combination, a plurality of piercing means arranged in side by side relation; support means supporting said plurality of piercing means for free movement in a predetermined direction respectively along diverging lines so that the spaces between said plurality of piercing means increase as the latter move in said direction; supply means located adjacent said plurality of piercing means for supplying a band of fibers to the latter; and moving means spaced in said predetermined direction from said supply means and located adjacent said plurality of piercing means for moving a band of fibers from said plurality of piercing means, whereby during movement of the band of fibers from said supply means to said moving means the band of fibers will be engaged by said piercing means and will move the latter on said support means along said diverging lines so that said plurality of piercing means will increase the width of the band of fibers while decreasing the thickness thereof.

15. Apparatus for decreasing the thickness of a band of fibers while increasing the width thereof, comprising, in combination, a plurality of piercing means arranged in side by side relation; support means supporting said plurality of piercing means for free movement in a predetermined direction respectively along diverging lines so that the spaces between said plurality of piercing means increase as the latter move in said direction; supply means located adjacent said plurality of piercing means for supplying a band of fibers to the latter; and moving means spaced in said predetermined direction from said supply means and located adjacent said plurality of piercing means for moving a band of fibers from said plurality of piercing means, whereby during movement of the band of fibers from said supply means to said moving means the band of fibers will be engaged by said piercing means and will move the latter on said support means along said diverging lines so that said plurality of piercing means will increase the width of the band of fibers while decreasing the thickness thereof; and shifting means located adjacent said plurality of piercing means and adjacent said moving means for shifting the band of fibers from said piercing means just before the band of fibers is engaged by said moving means.

References Cited in the file of this patent

UNITED STATES PATENTS

| Number | Name | Date |
|---|---|---|
| 49,947 | Bennett | Sept. 12, 1865 |
| 485,400 | Watson | Nov. 1, 1892 |
| 1,152,389 | Allen | Sept. 7, 1915 |
| 1,161,950 | Midgley | Nov. 30, 1915 |
| 1,189,873 | Rooney | July 4, 1916 |